Dec. 16, 1930.  J. DOCKL  1,785,542
WEIGHING DEVICE FOR DIAL BALANCES
Filed Dec. 31, 1928  3 Sheets-Sheet 3
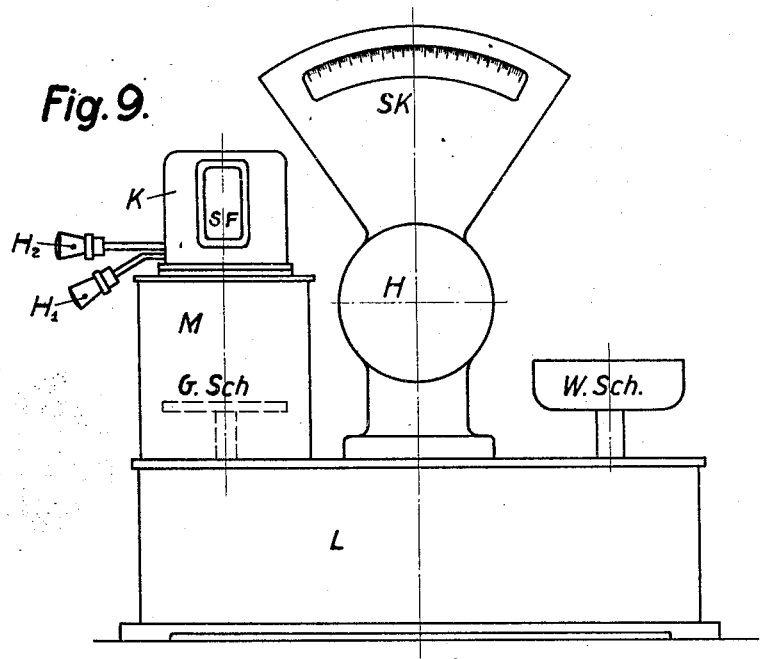
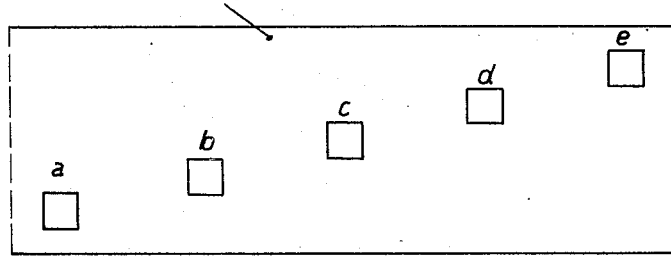
Inventor.
Johann Dockl
by Wm J. Hedlund
His attorney Patented Dec. 16, 1930

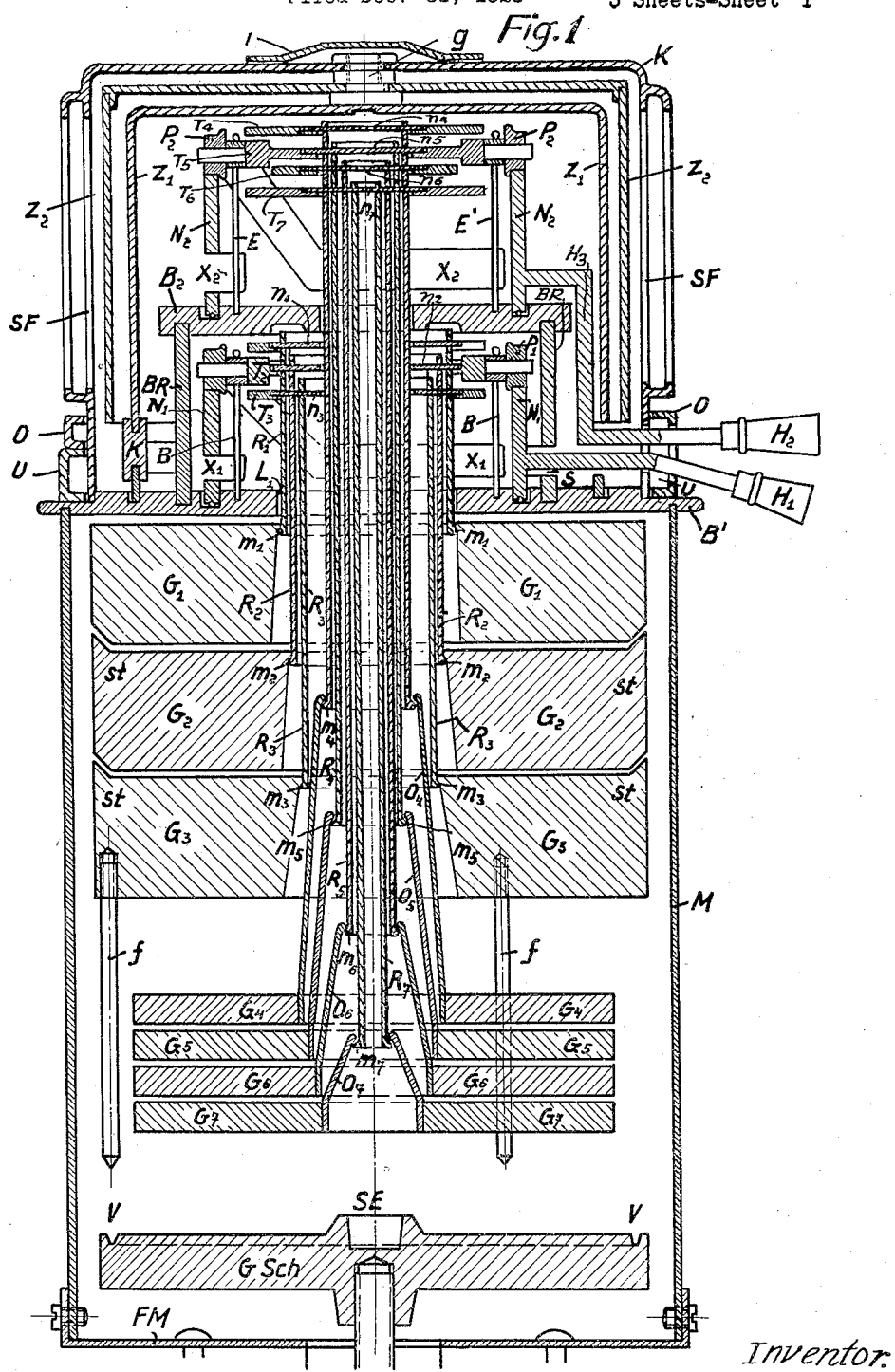

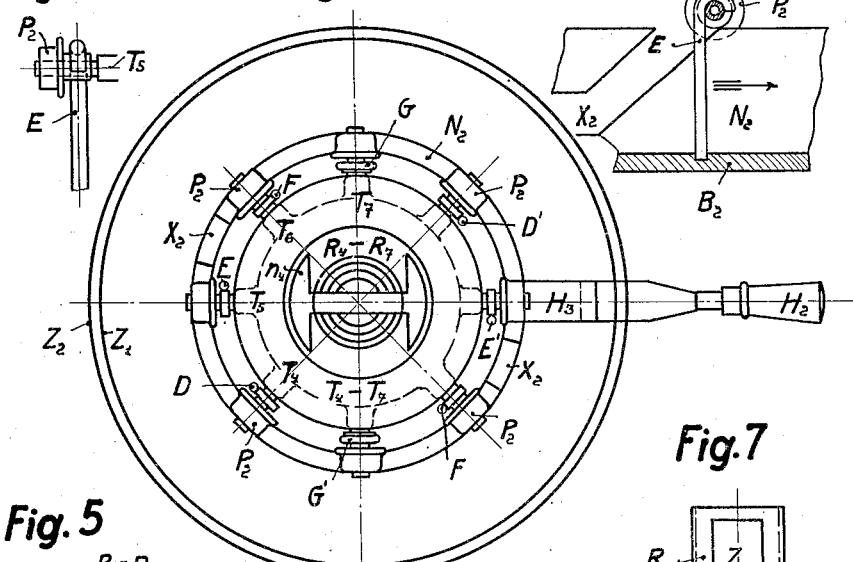

1,785,542

UNITED STATES PATENT OFFICE

JOHANN DOCKL, OF GRAZ, AUSTRIA, ASSIGNOR TO AKTIEBOLAGET SVEAEXPORT, OF STOCKHOLM, SWEDEN

WEIGHING DEVICE FOR DIAL BALANCES

Application filed December 31, 1928, Serial No. 329,353, and in Austria December 1, 1927.

The present invention relates to weighing machines, as for example those made by Messrs. Berkel, Lorenz, Schember amongst others, in which the weights are put on to the scales in a simple manner in a step-by-step fashion, the weights being of disc pattern and arranged one above the other and capable of being lifted singly or set down again by rotating a cylinder or cylinders having cam-like or screw shaped slots.

According to this invention, these carrying cylinders are so arranged that each of them serves to operate, in any desired group independently, upon weights suspended upon tubes adapted to slide one within the other. The said cylinders are provided for this purpose with two screw-shaped guide slots diametrically opposite one another and running horizontal at their lower parts.

A further feature of the invention is the device for indicating the desired weights.

The accompanying drawing shows an example of the invention, in which Fig. 1 is a vertical section, Fig. 2 a detail, Fig. 3 a plan, Figs. 4 and 5 details, Fig. 6 a plan at the level of the upper or lower carrying cylinders, Figs. 7 and 8 details, Fig. 9 a general elevation on a smaller scale, and Figs. 10 and 11 details of the indicator.

The weighing machine has as its object to combine an indicating mechanism with the doing away of the handling of weights e. g. between 1–19 lbs. (or kilos, as the case may be), such weights being picked up by manually operated mechanism and indicated by visible figures.

The loose weights mechanism is arranged above the weight pan G. Sch. of the indicating weighing machine and secured to the body L by a few screws, without affecting the up and down play of the weight pan.

According to the form shown in Fig. 1 the apparatus consists of an outer jacket M surrounding the weights $G_1$—$G_7$ ready for use and supporting on its upper end the base $B_1$. A second upper base $B_2$ is supported on the base $B_1$ by means of a base ring B R. Each base $B_1$ $B_2$ has a circular opening, as for instance $L_1$ in the lower base $B_1$ through which the suspension tubes which carry the weights can pass.

The bases $B_1$ $B_2$ are each provided with a concentric slot in which a lower cam ring $N_1$ and an upper cam ring $N_2$ respectively are adapted to rotate upon a ball race.

Each cam ring $N_1$ $N_2$ has two screw-like guide slots $X_1$ and $X_2$, arranged diametrically to the top edge of same and shaped after the manner of an inclined plane terminating downwards in a horizontal stretch, the lever $H_1$ of the cam ring $N_1$ being guided in its weight raising movement in a suitable slot S in the base ring B R.

Supporting plates $T_1$—$T_3$ and $T_4$—$T_7$ are carried on the two cam rings by means of rollers $P_1$ and $P_2$ arranged in a circle, the disposition of the rollers being such that each plate has a roller at both ends of its diameter. The axes of the rollers of the individual plates are, so far as the lower plates are concerned, spaced at one sixth of a circle apart (see Fig. 6), and, as regards the upper plates an eighth (see Fig. 3), but the arrangement of the plates one above the other is nevertheless such as to allow all the rollers $P_1$ and $P_2$ of the lower and upper group of carrier plates to rest upon the upper edge of the cam rings $N_1$ and $N_2$. These rollers and the plates connected thereto are given no turning motion horizontally, because the roller axles are restrained by pins A B C or A' B' C' and D—G or D'—G' standing up from the bases $B_1$ and $B_2$, only the cam rings $N_1$ and $N_2$ being rotatably moved underneath the rollers.

By this relative movement, it is possible to lower the rollers of each group of plates in the slots $X_1$ and $X_2$ and to let down, according to the weight to be measured on the scale, the weights $G_1$—$G_3$ (each of 5 lbs. or kilos as the case may be) carried by the plates connected with suspension tubes $R_1$—$R_3$, and the weights $G_4$—$G_7$ (of one lb. or kilo each) carried by the suspension tubes $R_4$—$R_7$.

The tubes $R_1$—$R_4$—$R_7$ carrying the upper and lower weights respectively are provided at their upper ends with longitudinal slits Z (Fig. 7) into which carrying lugs or claws $n_1$—$n_3$ and $n_4$—$n_7$ project, which lugs are connected with the respective carrier plates.

These carrying lugs are so arranged that they penetrate through slits in the tubes which telescope into one another, and in such a manner that the carrying lugs belonging to the lowest weight of each group penetrates all of the tubes of the group to which it belongs, the next succeeding higher-placed lugs penetrating one tube less, and so on, inasmuch as the upper length of carrying tube with its suspended weight only just reaches up to the carrying lugs.

Figs. 5 and 8 show examples of the carrying lugs in the position of having penetrated the slits in the tubes. The heavy weights $G_1$—$G_3$ hang direct upon flanges $m_1$—$m_3$ at the lower ends of the tubes $R_1$—$R_3$ and the weights $G_2$—$G_3$ are provided at their outer edges with upstanding rims $st$ in order that they may be nested centrally together.

Furthermore, the lowest weight $G_3$ is provided with three legs $f$ in order to enable the large weights $G_1$—$G_3$ to be brought upon the scale pan independently of the weights $G_4$—$G_7$, the legs $f$ entering an annular groove V in the weight pan.

The 1 lb. (or kilo) weights $G_4$—$G_7$ are suspended from the flanges $m_4$—$m_7$ of the tubes $R_4$—$R_7$ by means of hollow conical hangers $O_4$—$O_7$.

The weight pan is provided in the centre of its upper side with a centering cone SE for ensuring the correct placing of the lower weights $G_4$—$G_7$.

The lowering of the weights $G_1$—$G_3$ is performed by swinging the lever $H_1$ and thus causing the cam ring $N_1$ to rotate under the carrier plates and rollers $P_1$. The three carrier plates $T_1$—$T_3$ with their roller axles belonging to the group of weights $G_1$—$G_3$, are prevented from rotating by reason of pins A B C or A′ B′ C′ (see Figs. 2 and 4) being spaced in the interior of the carrying cam ring $N_1$ at intervals on one sixth of the circumference and shaped into hooks at their upper ends, so that coincident with the sliding motion of the cam ring and the travel of the upper end of the inclined plane under a roller, the latter is thereby guided downwards upon this inclined plane and is led into the horizontal continuation of the slot $X_1$, whereby the weight $G_3$ is let down first of all upon the weight pan. A further movement of the cam ring $N_1$ brings the weights $G_2$ and $G_1$ down upon the weight $G_3$, so that by this manipulation either 5, 10 or 15 lbs. (or kgs.) can be placed on the weight pan. Upon turning backwards the lever $H_1$ the rollers of these weights can be lifted out of the slots in reverse order, the rollers $P_1$ always bearing against the pins A—C and A′—C′, and being led vertically upwards then finally being locked against further action by the upper hook shaped portions.

In a similar manner the smaller weights $G_4$—$G_7$ are through the medium of their upper cam ring $N_2$ manipulated by the aid of the lever $H_2$ or its continuation $H_3$. According to the number of weights, eight stop pins, hook-shaped at their uper ends D—G and D′—G′ are arranged at intervals of one eighth of a circle, in order to be able to conduct each of the four weights $G_4$—$G_7$ into the slot $X_2$.

A cylinder $Z_1$ which is connected with the lever $H_1$ and mounted centrally with the cam rings, is provided with a slot at its lower part forming a complete circle excepting a portion $k$, in order not to hinder the motion of the lever $H_2$, and bears upon a half circle the numbers 0–19 arranged above one another in groups at three equal distances, that is to say; the half circle begins with the numbers 0, 1, 2, 3 and 4 for one third of the distance; the second third starts with the numerals 5, 6, 7, 8 and 9, whilst the third bears the numerals 10, 11, 12, 13 and 14, and where the half circle ends, the numerals 15, 16, 17, 18 and 19 (Fig. 11).

A second cylinder $Z_2$ situated centrally around the cylinder $Z_1$ (Fig. 10) and connected with the lever $H_2$ has in a half circle five holes $a$, $b$, $c$, $d$, $e$ the same size as the numerals and spaced from one another by one quarter of the half circumference, that is to say; the opening $a$ at the height of the numerals 0, 5, 10 and 15, the opening $b$ at the level of the numerals 1, 6, 11 and 16, the opening $c$ at the level of the numerals 2, 7, 12 and 17; the opening $d$ at the height of the numerals 3, 8, 13 and 18, besides at the half circle limit the opening $e$ at the height of the numerals 4, 9, 14 and 19. In the ten indication windows SF provided in the outer closing cover K at the same heights as the numerals (the windows being arranged in two groups for customers and sellers respectively) only those numerals can appear which at the moment become uncovered by the appropriate hole of the cylinder $Z_2$, for instance, the bottom numerals 0, 5, 10 and 15, which, whether according to the position of the lever $H_1$ or according to the raising or lowering of the individual 5 lb. (or kilos) weights, become visible only in the lowest hole $a$ of the cylinder $Z_2$ and receive these bottom numerals each according to the position of the lever $H_2$, or the raising or sinking of the individual one lb. (or kilo) weights through the holes $a$, $b$, $c$, $d$ and $e$ arranged in ascending step formation, to correspond with the indication numbers, the actual additional numerals increasing from 1 to 4. Similarly by return movement of the lever from an already high numeral any desired subtraction can be effected. Broken parts of a lb. (or kilo) can be read directly upon the scale of the weighing machine as ordinarily.

The two rings O and U, which surround the covers K lying one above the other, and which are compelled to move with the levers $H_1$ and H₂ along the guide slot of the cover, protect the inside of the apparatus from dust or dirt owing to the ring O compulsorily moving with the lever H₂, and the ring U with the lever H₁.

I claim:

1. In combination, in a device for placing the weights on the weight pan of a weighing machine, a group of disc-shaped weights, telescopically arranged tubes for suspending the weights, a cam cylinder supporting the tubes and having therein a slot partly helical and partly horizontal, and means for placing the weights upon or lifting them from, one by one, the weight pan by rotation of said cam cylinder or cylinders and by coaction with said slot or slots.

2. In combination, in a device for placing weights on the weight pan of a weighing machine, two sets of weights, telescopically arranged tubes for suspending the weights, two concentric cam cylinders supporting the tubes and having therein slots partly helical and partly horizontal, means for rotating said cylinders to lower the weights on to the weight pan, a housing enclosing the cylinders and having a window therein and a graduated element adjacent said housing and marked with numerals for registering with said window so as to permit the numerals appropriate to the proper weight to be made visible.

3. In combination with the combination of claim 1, the tubes having longitudinal slots, claws or lugs passed through the slots in said tubes, rollers rotatable upon the cylinder or cylinders, and plates carried by the rollers and connected to said claws or lugs.

4. In combination, in a device for placing the weights on the weight pan of a weighing machine, a group of weights, telescopically arranged tubes for suspending the weights, flanges at the lower ends of the tubes for connection either directly or by means of hollow conical hangers to the weights a cam cylinder or cylinders supporting the tubes and having therein a helical slot, and means for placing the weights upon or lifting them from, one by one, the weight pan by rotation of said cam cylinder or cylinders and by coaction with said slot or slots.

5. In a dial balance, in combination, two groups of disc-like weights disposed one upon another, rings with diametrically opposed helical slots for lowering the weights into operative position on the weight pan, supports operatively connected with said rings for the independent movement of the two groups of weights, tubes mounted upon said supports and carrying the weights, diametrically opposed rollers coacting with said rings and bearing plates carried by the rollers.

JOHANN DOCKL.